United States Patent
Jeong et al.

(10) Patent No.: US 8,533,458 B2
(45) Date of Patent: Sep. 10, 2013

(54) HEADEND SYSTEM FOR DOWNLOADABLE CONDITIONAL ACCESS SERVICE AND METHOD OF OPERATING THE SAME

(75) Inventors: Young Ho Jeong, Daejeon (KR); Soon Choul Kim, Daejeon (KR); Heejeong Kim, Daejeon (KR); Eun Jung Kwon, Daejeon (KR); Han Seung Koo, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 974 days.

(21) Appl. No.: 12/246,663

(22) Filed: Oct. 7, 2008

(65) Prior Publication Data

US 2009/0144539 A1    Jun. 4, 2009

(30) Foreign Application Priority Data

Dec. 3, 2007   (KR) .................. 10-2007-0124226

(51) Int. Cl.
  *H04L 29/06*   (2006.01)
(52) U.S. Cl.
  USPC ............................ 713/155; 713/169; 713/189
(58) Field of Classification Search
  USPC ......................................................... 713/155
  See application file for complete search history.

(56) References Cited

U.S. PATENT DOCUMENTS

| 6,246,767 | B1 | 6/2001 | Akins, III et al. | |
|---|---|---|---|---|
| 2004/0133794 | A1* | 7/2004 | Kocher et al. | 713/193 |
| 2007/0143812 | A1 | 6/2007 | Choi | |
| 2007/0217436 | A1 | 9/2007 | Markley et al. | |
| 2008/0098212 | A1* | 4/2008 | Helms et al. | 713/155 |

FOREIGN PATENT DOCUMENTS

| KR | 1020050003072 A | 1/2005 |
|---|---|---|
| KR | 1020050102808 A | 10/2005 |

* cited by examiner

*Primary Examiner* — Justin T Darrow
(74) *Attorney, Agent, or Firm* — Ladas & Parry LLP

(57) ABSTRACT

A method of operating a headend system for a downloadable conditional access service, the method including: receiving, by an Authentication Proxy (AP) server, basic authentication information from a Downloadable Conditional Access System (DCAS) host, the basic authentication information being required to authenticate the DCAS host; transmitting, by the AP server, the basic authentication information to an external trusted authority device which authenticates the DCAS host; generating, by the AP server, a session key for encrypting/decrypting a secure micro client using a session key sharing factor; obtaining, by the AP server, download-related information of the secure micro client from a DCAS Provisioning Server (DPS); and commanding, by the AP server, an Integrated Personalization System (IPS) server to download the secure micro client to the DCAS host based on the download-related information, the secure micro client being encrypted by the session key.

17 Claims, 6 Drawing Sheets

HEADEND SYSTEM FOR DOWNLOADABLE CONDITIONAL ACCESS SERVICE AND METHOD OF OPERATING THE SAME

CROSS-REFERENCE TO RELATED APPLICATION

This application claims the benefit of Korean Patent Application No. 10-2007-0124226, filed on Dec. 3, 2007, in the Korean Intellectual Property Office, the disclosure of which is incorporated herein by reference.

BACKGROUND OF THE INVENTION

1. Field of the Invention

The present invention relates to a headend system for a downloadable conditional access service and a method of operating the same.

This work was supported by the IT R&D program of MIC/IITA. [2007-S-007-01, The development of downloadable conditional access system]

2. Description of Related Art

When users desire to watch a specific program in cable networks, a Conditional Access System (CAS) determines whether to provide a service based on a user authentication and enables only approved user to receive the program.

In a CAS in an initial stage, each manufacturing company uses standards different from each other, and thus a CAS is not compatible with other devices excluding a device of a particular company. Accordingly, a broadcasting service provider is required to directly provide a receiving terminal to a subscriber, which imposes a heavy burden on a broadcasting service provider and causes a difficulty in updating a CAS.

The OpenCable has provided a standard separating a Conditional Access module from a subscriber terminal to overcome such a disadvantage, that is, to prevent a monopoly of manufacturing company, boost competition, and cause a decline in a product price. Accordingly, a CAS separated from a subscriber terminal is standardized as a cable card of a Personal Computer Memory Card International Association (PCMCIA) card type. Also, a broadcasting service provider provides a subscriber with only cable card without lending a terminal to a subscriber, and thereby may provide a fee-based broadcasting service. However, an expected result of OpenCable has not been achieved due to an increase in a cable card price and management cost as well as failure in a retail market of terminals.

In such a circumstance, a technology related to a downloadable CAS (DCAS) is provided. The DCAS downloads a conditional access software to a subscriber terminal without a separate hardware conditional access module, and thereby enables a fee-based broadcasting service to be provided.

Thus, a technology which maintains a compatibility with a existing headend system for a cable broadcasting system and safely transmits a conditional access software to a receiver is required.

BRIEF SUMMARY

The present invention provides a headend system for a downloadable conditional access service and a method of operating the same where an Authentication Proxy (AP) server and Downloadable Conditional Access System (DCAS) host authenticate each other and generate a same session key, and thus an access validity of the DCAS host may be efficiently determined.

The present invention also provides a headend system for a downloadable conditional access service and a method of operating the same which is compatible with a Conditional Access System (CAS) in a conventional art without significantly changing the CAS in the conventional art.

The present invention also provides a headend system for a downloadable conditional access service and a method of operating the same which may safely download a software-based secure micro client to a DCAS host.

The present invention also provides a headend system for a downloadable conditional access service and a method of operating the same which enable a broadcasting service provider to manage a CAS with a relatively low cost and enable a subscriber to easily install and update the CAS.

According to an aspect of the present invention, there is provided a method of operating a headend system for a downloadable conditional access service, the method including: receiving, by an Authentication Proxy (AP) server, basic authentication information from a Downloadable Conditional Access System (DCAS) host, the basic authentication information being required to authenticate the DCAS host; transmitting, by the AP server, the basic authentication information to an external trusted authority device which authenticates the DCAS host; and generating, by the AP server, a session key for encrypting/decrypting a secure micro client using a session key sharing factor, wherein the AP server and DCAS host share the session key sharing factor generated by the external trusted authority device, and the DCAS host generates a same key as the session key.

According to an aspect of the present invention, there is provided a headend system for a downloadable conditional access service, the headend system including: an AP server receiving basic authentication information which is basis of an authentication of a DCAS host from the DCAS host, transmitting the basic authentication information to an external trusted authority device which authenticates the DCAS host, and generating a session key for encrypting/decrypting a secure micro client image using a session key sharing factor, wherein the session key sharing factor generated by the external trusted authority device is shared with the DCAS host.

According to an aspect of the present invention, there is provided a headend system for a downloadable conditional access service, the headend system including: an IPS server encrypting a secure micro client by a session key, receiving a command to download the secure micro client to a DCAS host from an AP server, and transmitting the secure micro client, encrypted by the session key, to the DCAS host in response to the command of the AP server.

According to an aspect of the present invention, there is provided a headend system for a downloadable conditional access service, the headend system including: a DPS transmitting download-related information to an AP server according to a request from the AP server, the download-related information including information about a download scheme of a secure micro client or information about an address of an IPS server.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
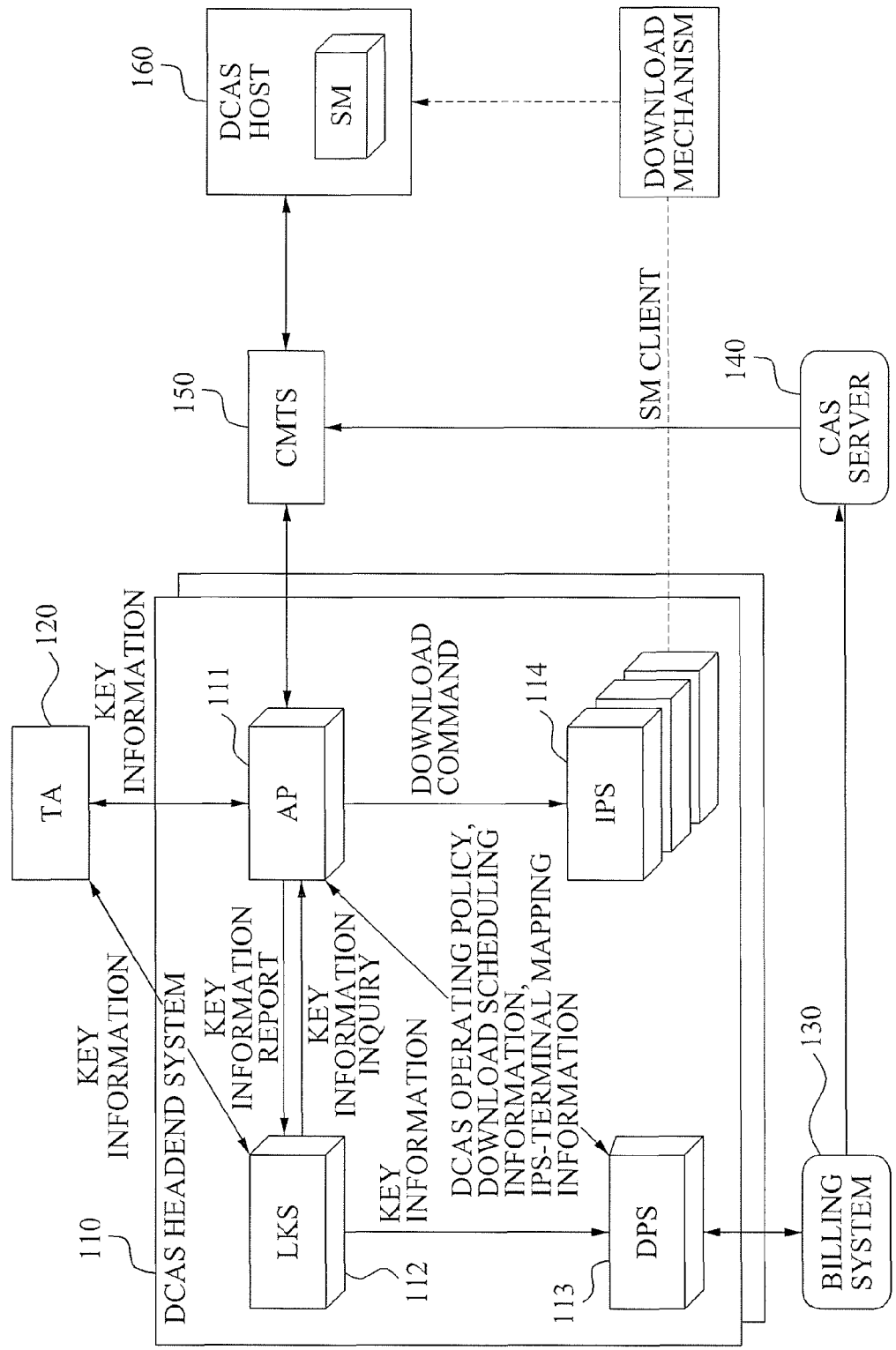
FIG. 1 is a block diagram illustrating a headend system for a downloadable conditional access service according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating a headend system 110 for a downloadable conditional access service according to an embodiment of the present invention.

Referring to FIG. 1, the headend system 110 includes an Authentication Proxy (AP) server 111, Local Key Server (LKS) 112, Downloadable Conditional Access System Provisioning Server (DPS) 113, and Integrated Personalization System (IPS) server 114.

The headend system 110 is installed separately from a existing Conditional Access System (CAS) server 140. Also, the headend system 110 is operated independently from the CAS server 140, and thereby may be compatible with an existing cable broadcasting system.

The LKS 112 stores and manages information about keys of servers such as a key of a secure micro (SM), history of identification (ID) information of the SM, key of the AP server 111, history of ID information of the AP server 111, and history of key information of the IPS server 114. Also, the DPS 113 manages download-related information and policy associated with a DCAS service. The IPS server 114 stores and manages an SM client to be downloaded to a DCAS host 160.

When a DCAS host 160 connected to a cable network exists, the AP server 111 transmits information associated with an SM of the DCAS host 160 to a Trusted Authority (TA) 120 to authenticate the DCAS host 160. The TA 120 is a reliable external authentication device. The TA 120 authenticates the DCAS host 160 using the received information associated with the SM.

The AP server 111 receives the download-related information from the DPS 113. The download-related information may include information associated with a connection (mapping) between the IPS server 114 and DCAS host 160, information associated with a download scheme of the SM, information associated with a DCAS operating policy, and download scheduling information.

In this instance, the AP server 111 commands the IPS server 114 to perform a process to download the SM client based on the download-related information. The IPS server 114 performs the process to download the SM client according to a download scheme corresponding to download-related information selected by the DPS 113 from a plurality of download schemes. The plurality of download schemes may correspond to a variety of transfer protocols such as a Carousel, Trivial File Transfer Protocol (TFTP), Hyper-Text Transfer Protocol (HTTP), and the like.

When an authentication of the DCAS host 160 is completed, the DCAS host 160 downloads and installs the SM client in the SM of the DCAS host 160. The DPS 113 reports to the CAS server 140 an access authority of the authenticated DCAS host 160 to a program through a billing system 130. In this instance, the CAS server 140 transmits an Entitlement Management Message (EMM) to the DCAS host 160 through a Cable Modem Termination System (CMTS) 150.

The SM client downloaded and installed in the SM of the DCAS host 160 extracts a code word using the received EMM through a CAS messages processing operation. Also, the SM client transmits the extracted code word to a Transport Processor (TP). The TP decodes the encrypted and received program using the code word.

Figure 2:
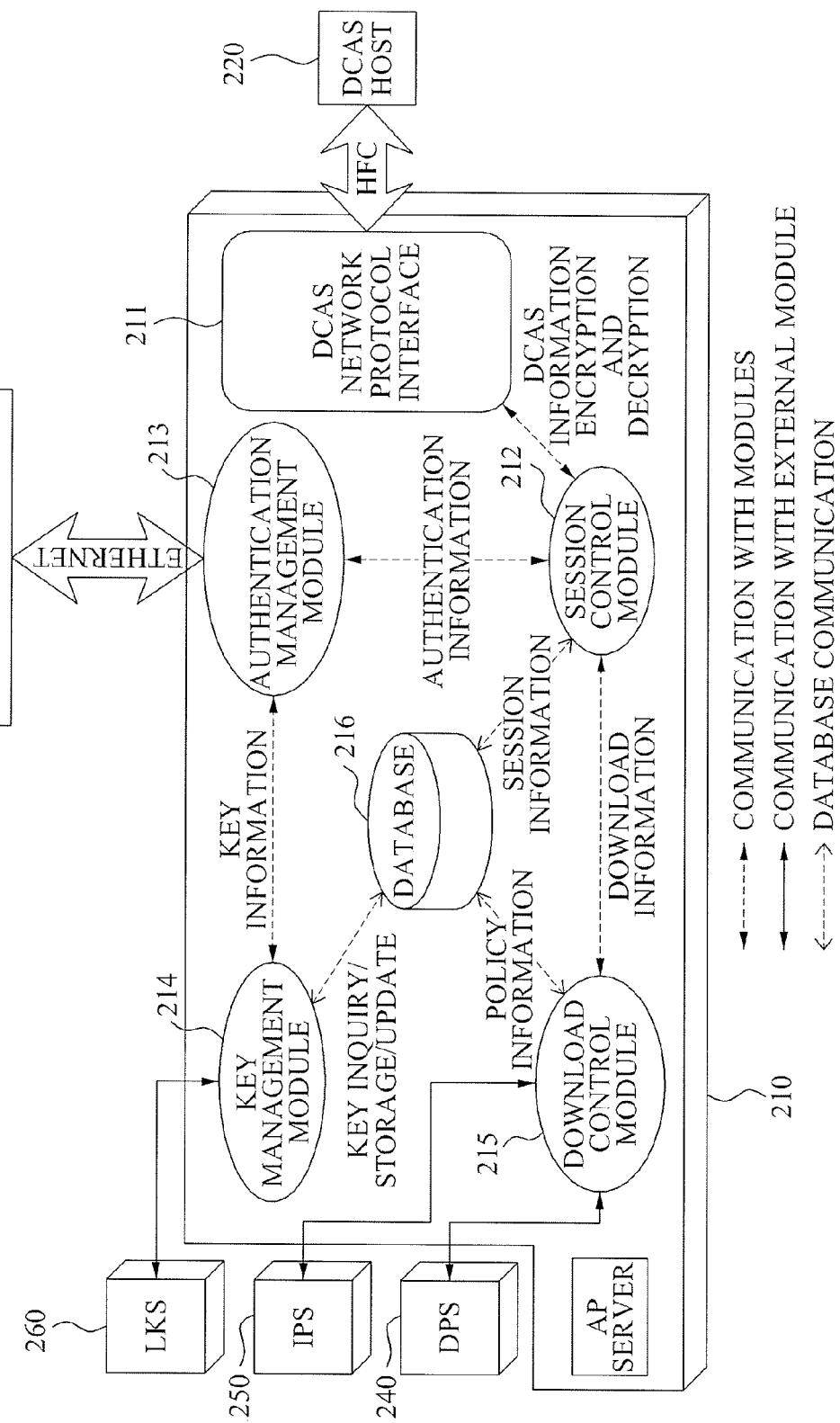
FIG. 2 is a block diagram illustrating an Authentication Proxy (AP) server according to an embodiment of the present invention.

FIG. 2 is a block diagram illustrating an Authentication Proxy (AP) server 210 according to an embodiment of the present invention.

Referring to FIG. 2, the AP server 210 includes a DCAS network protocol interface 211, session control module 212, authentication management module 213, key management module 214, download control module 215, and database 216.

The DCAS network protocol interface 211 receives/transmits a DCAS protocol message through a Hybrid-Fiber Coaxial (HFC). The DCAS protocol message is transmitted from a DCAS host 220.

The session control module 212 manages a state of every session and controls a session with respect to the DCAS host 220.

The authentication management module 213 and an external authentication device, that is, TA 230, authenticate an SM based on authentication information of the session control module 212. The authentication management module 213 transmits information associated with an authentication result of the SM to the session control module 212.

The key management module 214 stores key-related information, operated in the AP server 210, in the database 216 while transmitting the key-related information to the LKS 260. Also, in case of emergency, the key management module 214 requests for a backup of the key-related information to the LKS 260 for data restoration.

The download control module 215 stores information associated with a connection between the IPS server 250 and DCAS host 220, download scheduling information, and information associated with a DCAS operating policy, received from the DPS 240, in the database 216. Also, the download control module 215 transmits a command received from the session control module 212 to the IPS server 250 in order to enable the SM client to be downloaded to an authenticated DCAS subscriber terminal sub system. The command indicates the IPS server 250 to perform a process to download the SM client.

Figure 3:
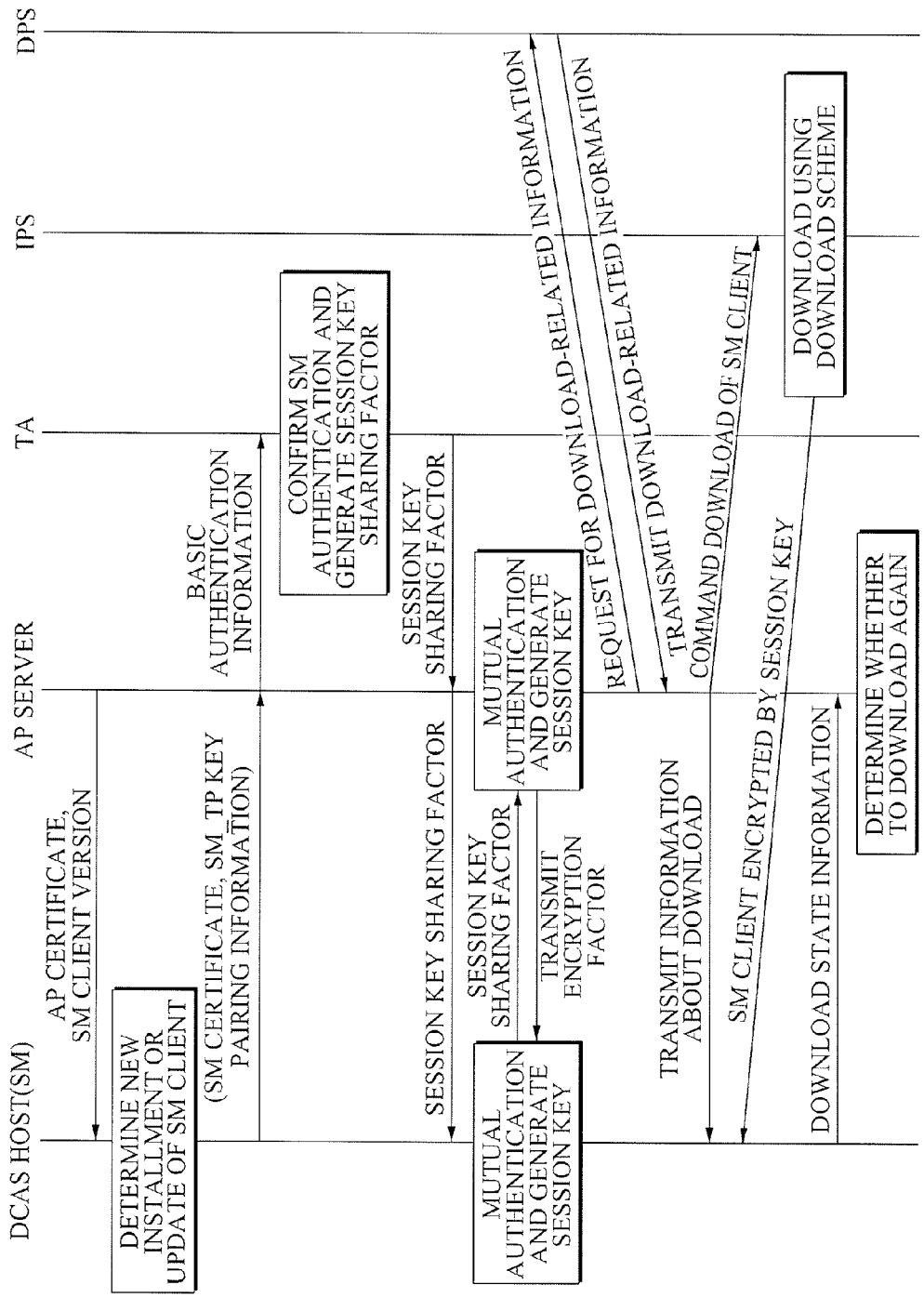
FIG. 3 is a flowchart illustrating a method of operating a headend system for a downloadable conditional access service according to an embodiment of the present invention.

FIG. 3 is a flowchart illustrating a method of operating a headend system for a downloadable conditional access service according to an embodiment of the present invention.

Referring to FIG. 3, an AP server continuously transmits a certificate of the AP server and SM client version information to a DCAS host via a DCAS network protocol interface. The certificate of the AP server and SM client version information, currently operated, are used to determine whether downloading of an SM client is necessary. The certificate of the AP server is used to authenticate a message received from the AP server by the DCAS host, and to confirm an identify of the AP server.

The DCAS host connected to a DCAS network determines whether to newly install or update the SM client using the received SM client version information. When the SM client is determined to be newly installed or updated, the DCAS host transmits basic authentication information to the AP server.

The basic authentication information includes information associated with a key pairing of a TP and SM, a certificate of the SM, and the like. The certificate of the SM may be used when the AP server authenticates a message received from the DCAS host and confirms an identity of the DCAS host.

The AP server transmits the basic authentication information to the TP, and the TP authenticates the SM. When the authentication of the SM is completed, the AP server generates a session key sharing factor, and transmits the generated session key sharing factor to the AP server.

The AP server shares the session key sharing factor with the DCAS host. The AP server and DCAS host sharing the session key sharing factor perform a mutual authentication. When the authentication is completed, each session key is generated. The session key may be used to encrypt or decrypt a DCAS message and SM client.

The AP server requests a DPS for download-related information. The download-related information may include information associated with a connection (mapping) between an IPS server and DCAS host, information associated with an address of the IPS server, and information associated with a download scheme of the SM or a name of an SM client. The AP server transmits the download-related information to the DCAS host.

The AP server commands the IPS server to perform a process to download the SM client according to a download scheme. The IPS server performs the process to download the SM client according to the selected download scheme.

The DCAS host transmits download state information to the AP server in association with whether the SM client is normally downloaded. The AP server determines whether the SM client is to be downloaded again based on the received download state information. When it is determined that the SM client is to be downloaded again, the AP server performs a process to download the SM client again.

The method of operating a headend system for a downloadable conditional access service according to the above-described embodiment of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figure 4:
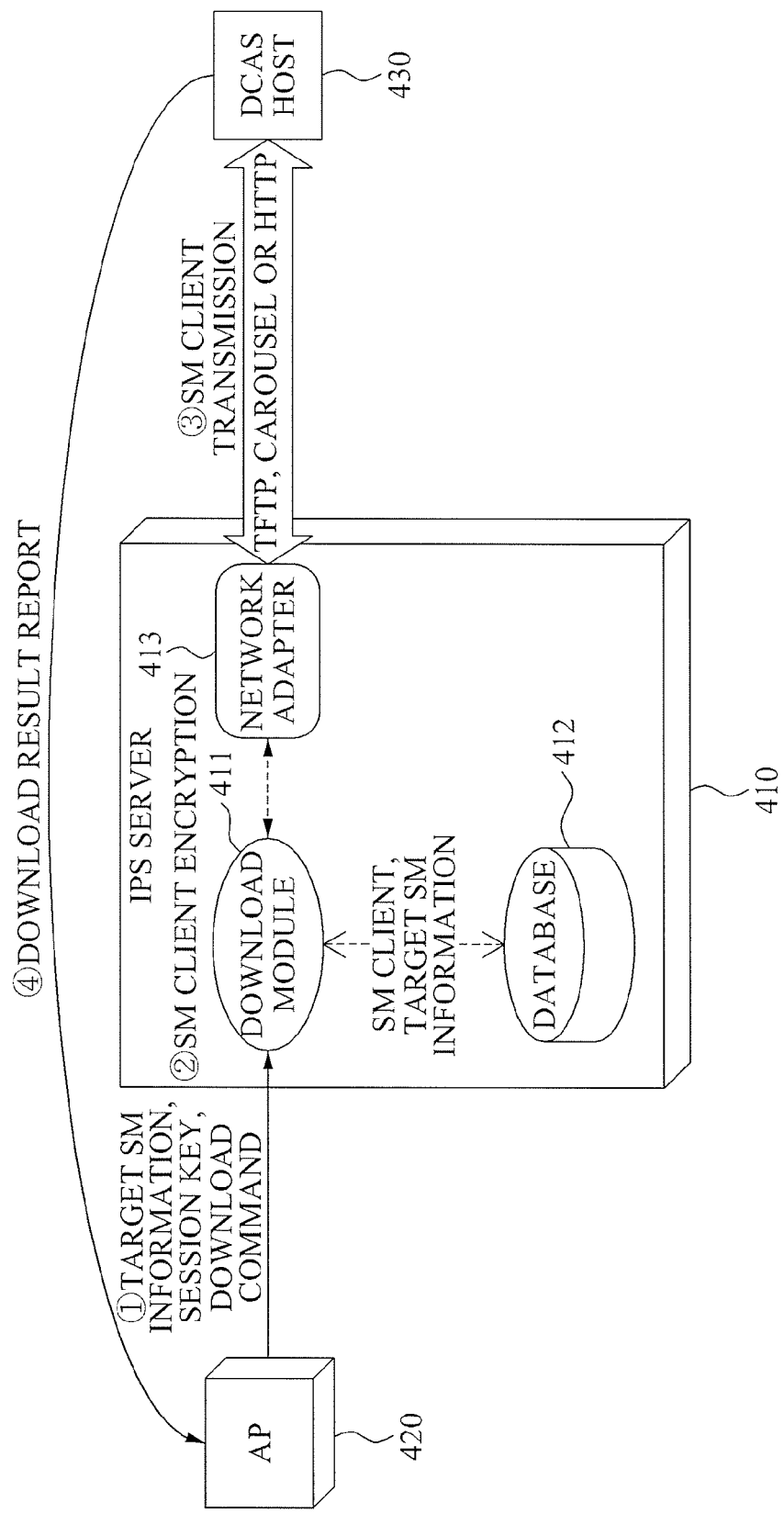
FIG. 4 is a block diagram illustrating an Integrated Personalization System (IPS) server according to an embodiment of the present invention.

FIG. 4 is a block diagram illustrating an Integrated Personalization System (IPS) server 410 according to an embodiment of the present invention.

Referring to FIG. 4, the IP server 410 includes a download module 411, database 412, and network adapter 413.

The download module 411 stores, in the database 412, an SM client to be downloaded and information associated with a DCAS host 430 related to the download module 411. Also, the download module 411 encrypts the SM client according to a request from the AP server 420, and performs a process to download the encrypted SM client. The network adapter 413 performs a network interoperation to enable the download module 411 to transmit the SM client.

Also, the IPS server 410 stores and manages an SM client image, and performs a process to enable the SM client to be safely downloaded to the DCAS host 430. Herein, a mutual authentication of the AP server 420 and DCAS host 430 is completed, and the SM client image is used to perform a conditional access function in a specific DCAS host 430.

The safe download of the SM client refers to reducing data loss and data change and to transmitting SM client having an accurate version. For this, the SM client is encrypted using a session key generated through the authentication between the AP server 420 and DCAS host 430. A download scheme with respect to the encrypted SM client may be a broadcast carousel, TFTP, HTTP, and the like. However, the IPS server 410 and the AP server 420 authenticate each other and the IPS server 410 is provided with session key and information about a download policy before encrypting the SM client or performing the process to download.

An example of downloading the SM client according to an embodiment of the present invention is described.

The AP server 420 transmits a download command with respect to the SM client, information associated with the DCAS host 430, and session key to the IPS server 410. The IPS server 410 encrypts the SM client using the session key generated through the authentication between the AP server 420 and DCAS host 430.

The IPS server 410 performs a process to download the encrypted SM client using any one of a plurality of download schemes.

The DCAS host 430 receiving the SM client reports information about a download result to the AP server 420. It is reported that information associated with installment and operation result of the SM client as well as the information about the download result.

The above-described operation is repeated a plurality of times, and thus a plurality of SM clients in a single session may be downloaded to the DCAS host 430.

Figure 5:
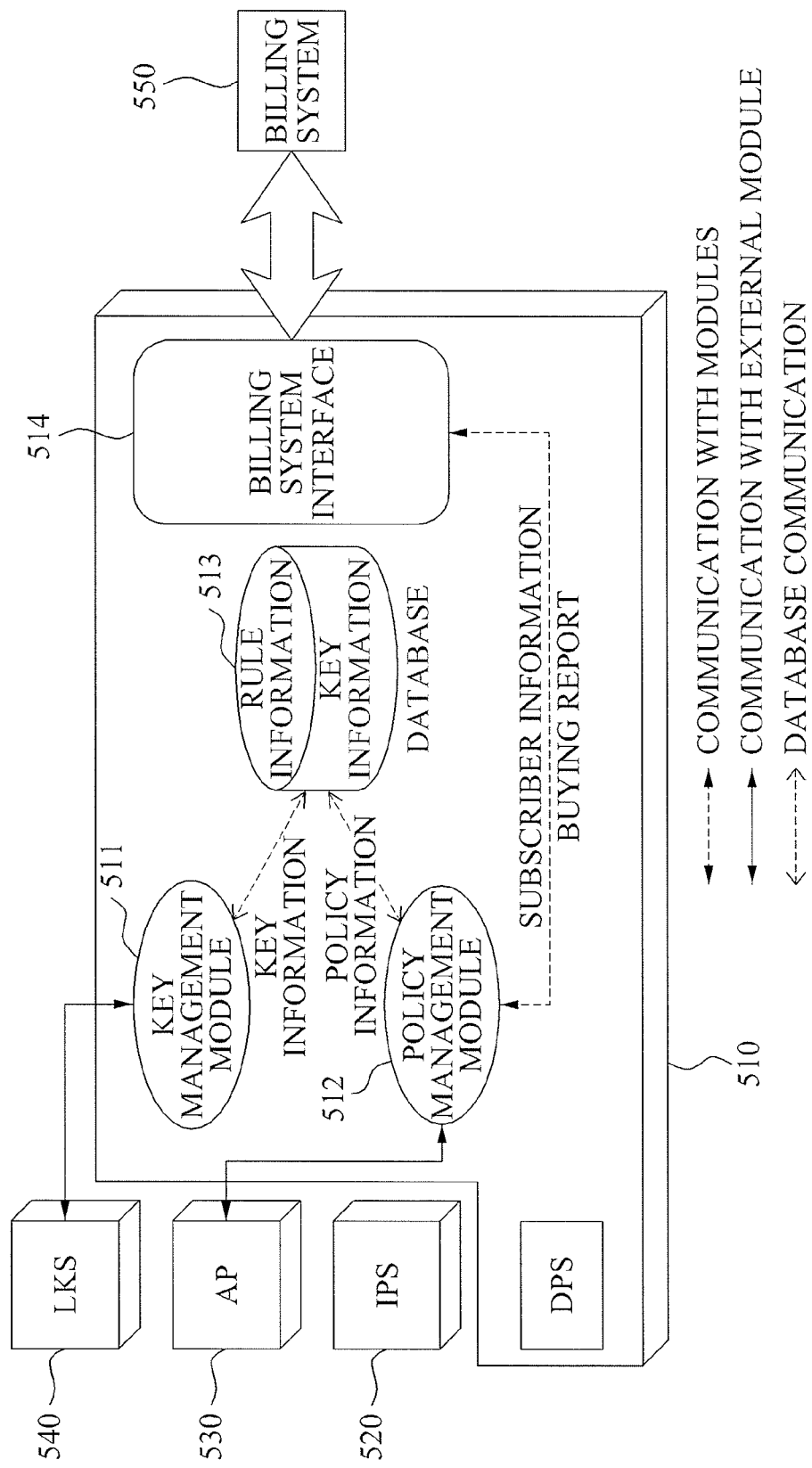
FIG. 5 is a block diagram illustrating a Downloadable Conditional Access System Provisioning Server (DPS) according to an embodiment of the present invention.

FIG. 5 is a block diagram illustrating a Downloadable Conditional Access System Provisioning Server (DPS) 510 according to an embodiment of the present invention.

Referring to FIG. 5, the DPS 510 includes a key management module 511, policy management module 512, database 513, and billing system interface 514.

The DPS 510 determines and maintains a DCAS policy of a cable service provider in a DCAS service structure, that is, the DPS 510 is performed as a central manager. The DPS 510 transmits/receives a message for a functional operation from/to an LKS 540. Also, the DPS 510 communicates with a billing system 550 via the billing system interface 514.

Main information required to determine and maintain the DCAS policy includes mapping information between an IPS server 520 and DCAS host, information associated with downloading an SM client, download scheduling information of the SM client, download-related information associated with a download scheme, and configuration information of DCAS headend system.

The policy management module 512 maintains and manages information required for the DCAS policy of the cable service provider in the database 513. Also, the policy management module 512 manages a generation, deletion, or change of DCAS policy information to enable the AP server 530 to instantly apply a changed DCAS policy. Also, the policy management module 512 selects any one of a plurality of IPS servers. The IPS server 520 is used to perform a process to download the SM client.

The key management module 511 performs a backup of key-related information from an LKS 540 on a disaster recovery.

The billing system interface 514 transmits buying-related information transmitted via the AP server 530 to the billing system 550.

Figure 6:
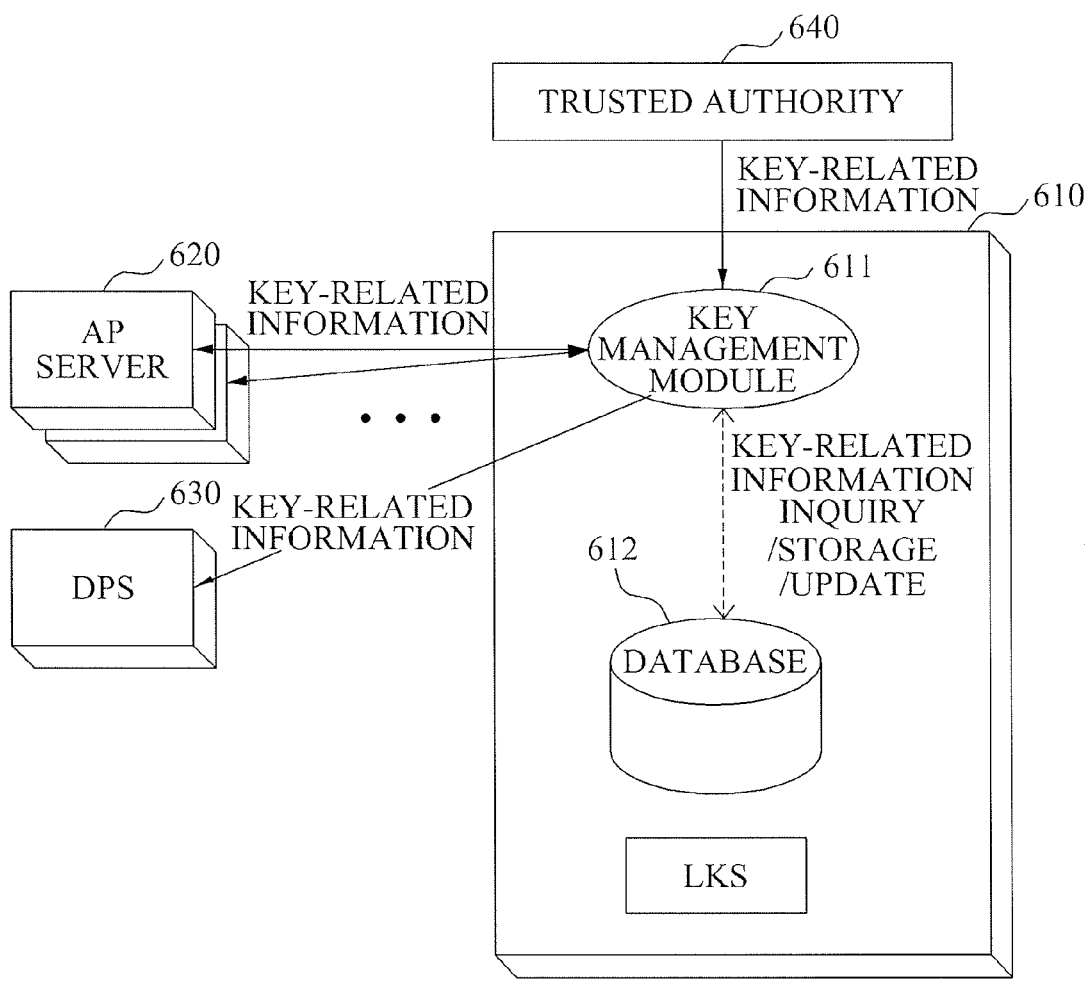
FIG. 6 is a block diagram illustrating a Local Key Server (LKS) according to an embodiment of the present invention.

FIG. 6 is a block diagram illustrating a Local Key Server (LKS) 610 according to an embodiment of the present invention.

Referring to FIG. 6, the LKS 610 includes a key management module 611 and database 612.

The key management module 611 stores, maintains, and manages a key of every SM operated in a network of a service provider, history of ID information of an SM, key of an AP server 620, history of ID information of the AP server 620, and history of key information of an IPS server, in the database 612.

The key management module 611 inquires key-related information in the database 612 according to a request from the AP server 620 and DPS 630. Also, the key management module 611 transmits the inquired information to the AP server 620 or DPS 630. The key management module 611 restores the key-related information of the database 612 of the LKS 610 using a key record stored in a TA 640 on a disaster recovery.

According to an embodiment of the present invention, in a headend system for a downloadable conditional access service and a method of operating the same, an AP server and DCAS host authenticate each other and generate a same session key, and thus an access validity of the DCAS host may be efficiently determined.

Also, according to an embodiment of the present invention, a headend system for a downloadable conditional access service and a method of operating the same is compatible with a CAS in a conventional art without significantly changing the CAS in the conventional art.

Also, according to an embodiment of the present invention, a headend system for a downloadable conditional access service and a method of operating the same may safely download a software-based secure micro client to a DCAS host.

Also, according to an embodiment of the present invention, a headend system for a downloadable conditional access service and a method of operating the same enable a broadcasting service provider to manage a CAS with a relatively low cost and enable a subscriber to easily install and update the CAS.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of operating a headend system for a downloadable conditional access service, the method comprising:
receiving, by an Authentication Proxy (AP) server, basic authentication information from a Downloadable Conditional Access System (DCAS) host, the basic authentication information being required to authenticate the DCAS host;
transmitting, by the AP server, the basic authentication information to an external trusted authority device which authenticates the DCAS host,
wherein after the DCAS host in authenticated, the DCAS host is able to communicate with the AP server,
wherein after the external trusted authority device authenticates the DCAS host and DCAS host communicates with the AP server, the external trusted authority device generates a session key sharing factor;
transmitting, by the external trusted authority device, the session key sharing factor to the AP server,
wherein the AP server receives and shares the session key sharing factor with the DCAS host,
wherein, after sharing the session key sharing factor with the DCAS host, the DCAS host and the AP server perform mutual authentication based on the session key sharing factor,
wherein, after the mutual authentication between the DCAS host and the AP server has been completed, generating by each of the AP server and the DCAS host a session key, and
wherein the generating step of the session key, by the AP server and the DCAS host, the session key allows for encrypting/decrypting a secure micro client by the IPS and the DCAS host,
wherein the generating step of the session key, by the AP server and the DCAS host, the session key allows for encrypting/decrypting a DCAS message by the AP server and the DCAS host,
wherein the session key for both encrypting/decrypting the secure micro client by the IPS and the DCAS host and encrypting/decrypting the DCAS message by the AP server and the DCAS host is generated by each of the AP server and the DCAS host,
wherein the session is generated based on the session key sharing factor generated from the external trusted authority device after the external trusted authority device authenticates the DCAS host and DCAS host communicates with the AP server, and
wherein the session key generated by the AP server and the session key generated by the DCAS host are a same session key.

2. The method of claim 1, further comprising:
obtaining, by the AP server, download-related information of the secure micro client from a DCAS Provisioning Server (DPS).

3. The method of claim 2, further comprising:
commanding, by the AP server, an Integrated Personalization System (IPS) server to download the secure micro client to the DCAS host based on the download-related information, the secure micro client being encrypted by the session key.

4. The method of claim 3, wherein the IPS server selects any one of a plurality of download schemes according to the command of the AP server, and downloads the secure micro client, encrypted by the session key, to the DCAS host using the selected download scheme.

5. The method of claim 3, further comprising:
   determining, by the AP server, whether the secure micro client is to be downloaded again in response to download state information generated by the DCAS host.

6. The method of claim 1, wherein, in the generating step, the AP server and the DCAS host authenticate each other using the session key sharing factor, and generate the session key according to a result of the authenticating.

7. The method of claim 1, wherein the external trusted authority device authenticates the DCAS host using the basic authentication information, and when the authentication of the DCAS host is successful, generates the session key sharing factor.

8. The method of claim 2, wherein the download-related information includes information about a download scheme of the secure micro client or information about an address of the IPS server.

9. The method of claim 2, wherein, in the obtaining step, the AP server obtains the download-related information from the DPS server, and transmits the obtained download-related information to the DCAS host.

10. A headend system for a downloadable conditional access service, the headend system comprising:
   an Authentication Proxy (AP) server receiving basic authentication information which is basis of an authentication of a Downloadable Conditional Access System (DCAS) host from the DCAS host, transmitting the basic authentication information to an external trusted authority device which authenticates the DCAS host,
   wherein after the external trusted authority device authenticates the DCAS host, the external trusted authority device generates a session key sharing factor;
   transmitting, by the external trusted authority device, the session key sharing factor to the AP server,
   wherein the AP server shares the session key sharing factor with the DCAS host,
   wherein, after sharing the session key sharing factor with the DCAS host, the DCAS host and the AP server perform mutual authentication,
   wherein, after mutual authentication between the DCAS host and the AP server has been completed, generating by each of the AP server and the DCAS host a session key, and
   wherein the generating of the session key by the AP server and the generating of session key by the DCAS host allows for encrypting/decrypting a secure micro client image by the IPS and the DCAS host,
   wherein the generating of the session key, by the AP server and the DCAS host, the generated session key allows for encrypting/decrypting a DCAS message by the AP server and the DCAS host,
   wherein the session key for both encrypting/decrypting a secure micro client by the IPS and the DCAS host and encrypting/decrypting a DCAS message by the AP server and the DCAS host is generated from by each of the AP server and the DCAS host,
   wherein the session key is generated based on the session key sharing factor generated from the external trusted authority device after the external trusted authority device authenticates the DCAS host and the DCAS host communicates with the AP server, and
   wherein the session key generated by the AP server and the session key generated by the DCAS host are a same session key.

11. The headend system of claim 10, wherein the AP server obtains download-related information of the secure micro client from a DCAS Provisioning Server (DPS), and commands an Integrated Personalization System (IPS) server to perform a process to download the secure micro client to the DCAS host based on the download-related information.

12. The headend system of claim 11, wherein the download-related information includes information about a download scheme of the secure micro client or information about an address of the Integrated Personalization System (IPS) server.

13. The headend system of claim 11, wherein the AP proxy server determines whether the secure micro client is to be downloaded again in response to download state information generated by the DCAS host.

14. A headend system for a downloadable conditional access service, the headend system comprising:
   an Integrated Personalization System (IPS) server encrypting a secure micro client by a session key, receiving a command to download the secure micro client to a Downloadable Conditional Access System (DCAS) host from an Authentication Proxy (AP) server, and transmitting the secure micro client, encrypted by the session key, to the DCAS host in response to the command of the AP server,
   wherein the AP server and DCAS host performs mutual authentication between each other prior to generating the session key,
   wherein, after the mutual authentication between the DCAS host and the AP server has been completed, generating by each of the AP server and the DCAS host the session key
   wherein the generating of the session key, by the AP server and the DCAS host, the generated session key allows for encrypting/decrypting of the secure micro client by the IPS server and the DCAS host,
   wherein the session key for encrypting/decrypting a secure micro client by the IPS and the DCAS host is generated from by each of the AP server and the DCAS host,
   wherein the session key is generated based on a session key sharing factor used by both the DCAS host and the AP server, and
   wherein the session key generated by the AP server and the session key generated by the DCAS host are a same session key, and
   wherein the same session key is configured to encrypt/decrypt a DCAS message to/from the AP server and the DCAS host and configured to encrypt/decrypt the secure micro client to/from the IPS server and the DSAS host.

15. The headend system of claim 14, wherein the IPS server performs a process to download the secure micro client to the DCAS host using a download scheme corresponding to the command of the AP server from among a plurality of download schemes.

16. A headend system for a downloadable conditional access service, the headend system comprising:
   a Downloadable Conditional Access System (DCAS) Provisioning Server (DPS) transmitting download-related information to an Authentication Proxy (AP) server according to a request from the AP server, the download-related information comprising at least one of information about a download scheme of a secure micro client and information about an address of an IPS server,
   wherein the AP server commands an Integrated Personalization System (IPS) server to perform a process to download the secure micro client, encrypted by a session key, to a DCAS host based on the download-related information, and the AP server and DCAS host performs mutual authentication between each other prior to generating the session key, wherein, after the mutual authentication between the DCAS host and the AP server has been completed, generating by each of the AP server and the DCAS host the session key wherein the generating of the session key, by the AP server and the DCAS host, the generated session key allows for encrypting/decrypting of the secure micro client by the IPS server and the DCAS host, wherein the generating of the session key, by the AP server and the DCAS host, the session key allows for encrypting/decrypting a DCAS message by the AP server and the DCAS host, wherein the session key for both encrypting/decrypting the secure micro client by the IPS and the DCAS host and encrypting/decrypting the DCAS message by the AP server and the DCAS host is configured to be generated from each of the AP server and the DCAS host wherein the session key is generated based on a session key sharing factor generated from an external trusted authority device after the external trusted authority device authenticates the DCAS host and the DCAS host communicates with the AP server, and wherein the session key generated by the AP server and the session key generated by the DCAS host are a same session key, and wherein the session key is configured for determining access validity of the DCAS host.

17. The headend system of claim 16, wherein the IPS server selects any one of a plurality of download schemes according to the command of the AP server, and performs a process to download the secure micro client, encrypted by the session key, to the DCAS host using the selected download scheme.

* * * * *